(12) United States Patent
Neely et al.

(10) Patent No.: US 7,663,340 B1
(45) Date of Patent: Feb. 16, 2010

(54) BATTERY OPERATED EXTENSION CORD

(76) Inventors: Connie L. Neely, 1921 W. 39th Pl., Los Angeles, CA (US) 90062; Tracy Neely, 1921 W. 39th Pl., Los Angeles, CA (US) 90062

( * ) Notice: Subject to any disclaimer, the term of this patent is extended or adjusted under 35 U.S.C. 154(b) by 316 days.

(21) Appl. No.: 11/695,529

(22) Filed: Apr. 2, 2007

(51) Int. Cl.
*H01M 10/46* (2006.01)
(52) U.S. Cl. ...................................... 320/111
(58) Field of Classification Search ............... 320/110, 320/111, 112, 114, 115
See application file for complete search history.

(56) References Cited

U.S. PATENT DOCUMENTS

| | | | |
|---|---|---|---|
| 5,077,513 A | 12/1991 | Dea et al. | |
| 5,233,230 A | 8/1993 | Bonar | |
| D340,908 S | 11/1993 | Tortola | |
| 5,315,475 A | 5/1994 | Scheidel et al. | |
| 5,783,927 A * | 7/1998 | Chen | 320/110 |
| 6,850,041 B2 | 2/2005 | Takano | |
| 2003/0164645 A1* | 9/2003 | Crandell, III | 307/80 |
| 2004/0196000 A1* | 10/2004 | Wei | 320/111 |
| 2005/0040788 A1* | 2/2005 | Tseng | 320/111 |

* cited by examiner

*Primary Examiner*—Edward Tso
(74) *Attorney, Agent, or Firm*—Crossley Patent Law; Mark A. Crossley

(57) ABSTRACT

A battery operated extension cord that includes a housing, a rechargeable battery pack, a pair of 125-volt alternating current receptacles, a power inverter to convert the voltage direct current from the battery to the required alternating current, a charger, and a plug connected to the charger to allow the charger to be plugged into an existing wall plug unit in order to charge the present invention. The housing is located in a hinged-carrying case, which includes a separate pocket for the battery housing and a cylinder around which the extension cord could be wound.

7 Claims, 3 Drawing Sheets

FIG. 1
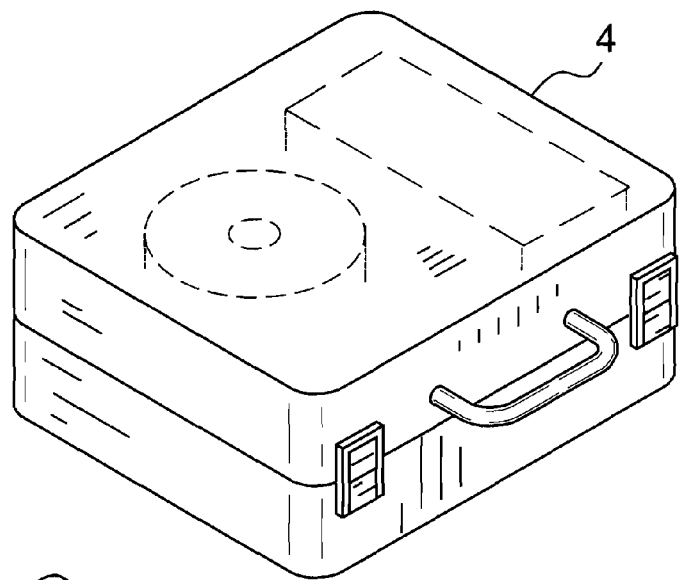
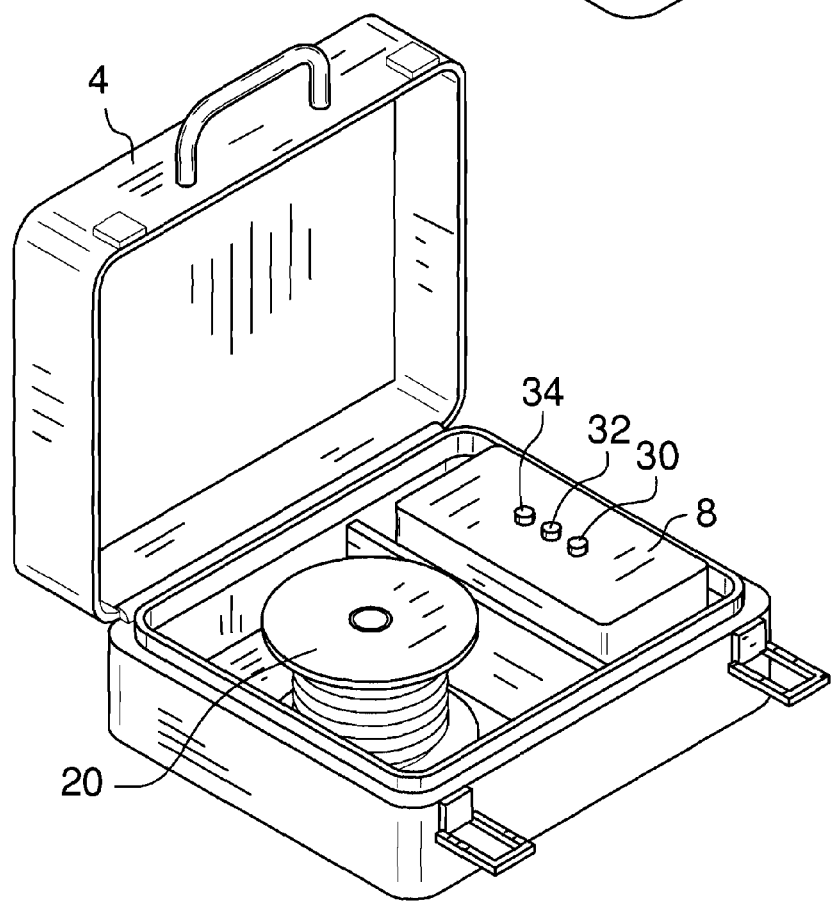
FIG. 2

BATTERY OPERATED EXTENSION CORD

BACKGROUND OF THE INVENTION

The present invention concerns that of a new and improved battery operated extension cord that includes a housing, a rechargeable battery pack, a pair of 125-volt alternating current receptacles, a power inverter to convert the voltage direct current from the battery to the required alternating current, a charger, and a plug connected to the charger to allow the charger to be plugged into an existing wall plug unit in order to charge the present invention.

DESCRIPTION OF THE PRIOR ART

U.S. Pat. No. 5,077,513, issued to Dea et al., discloses a portable battery power source which includes a frame with a pair of upwardly angled support members, a battery supported tray for holding a source battery, and a pair of suspension members extending upwardly from the tray for connecting the tray to the pair of support members attached to a wheel-mounted frame.

U.S. Pat. No. 6,850,041 B2, issued to Takano, discloses a battery pack used as a power source for a portable device and chargeable by a charging unit.

U.S. Pat. No. 5,783,927, issued to Chen, discloses a power supply unit for providing DC input to a portable electronic device which is operable with a rechargeable battery and an AC/DC adapter receiving power from an AC power source.

U.S. Pat. D340,908, issued to Tortola, discloses a portable battery with a cord for powering a device.

U.S. Pat. No. 5,233,230, issued to Bonar, discloses an electrical power cord for connecting an AC current source to an appliance and a DC current battery power pack connected to the power cord to replace AC current when there is a loss of AC current.

U.S. Pat. No. 5,315,475, issued to Scheidel et al., discloses a power cord for use by electricians to supply power to the construction area while normal electrical power has been disconnected.

SUMMARY OF THE INVENTION

The present invention concerns that of a new and improved battery operated extension cord that includes a housing, a rechargeable battery pack, a pair of 125-volt alternating current receptacles, a power inverter to convert the voltage direct current from the battery to the required alternating current, a charger, and a plug connected to the charger to allow the charger to be plugged into an existing wall plug unit in order to charge the present invention. The housing is located in a hinged-carrying case, which includes a separate pocket for the battery housing and a cylinder around which the extension cord could be wound.

There has thus been outlined, rather broadly, the more important features of a battery operated extension cord that the detailed description thereof that follows may be better understood and in order that the present contribution to the art may be better appreciated. There are, of course, additional features of the battery operated extension cord that will be described hereinafter and which will form the subject matter of the claims appended hereto.

In this respect, before explaining at least one embodiment of the battery operated extension cord in detail, it is to be understood that the battery operated extension cord is not limited in its application to the details of construction and to the arrangements of the components set forth in the following description or illustrated in the drawings. The battery operated extension cord is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present battery operated extension cord. It is important, therefore, that the claims be regarded as including such equivalent constructions insofar as they do not depart from the spirit and scope of the present invention.

It is therefore an object of the present invention to provide a battery operated extension cord which has all of the advantages of the prior art and none of the disadvantages.

It is another object of the present invention to provide a battery operated extension cord which may be easily and efficiently manufactured and marketed.

It is another object of the present invention to provide a battery operated extension cord which is of durable and reliable construction.

It is yet another object of the present invention to provide a battery operated extension cord which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 1 shows a perspective view of the battery operated electrical cord, located in its housing, with the housing being shut.

FIG. 2 shows a perspective view of the battery operated electrical cord, located in its housing, with the housing being open.

DESCRIPTION OF THE PREFERRED EMBODIMENT

Figure 3:
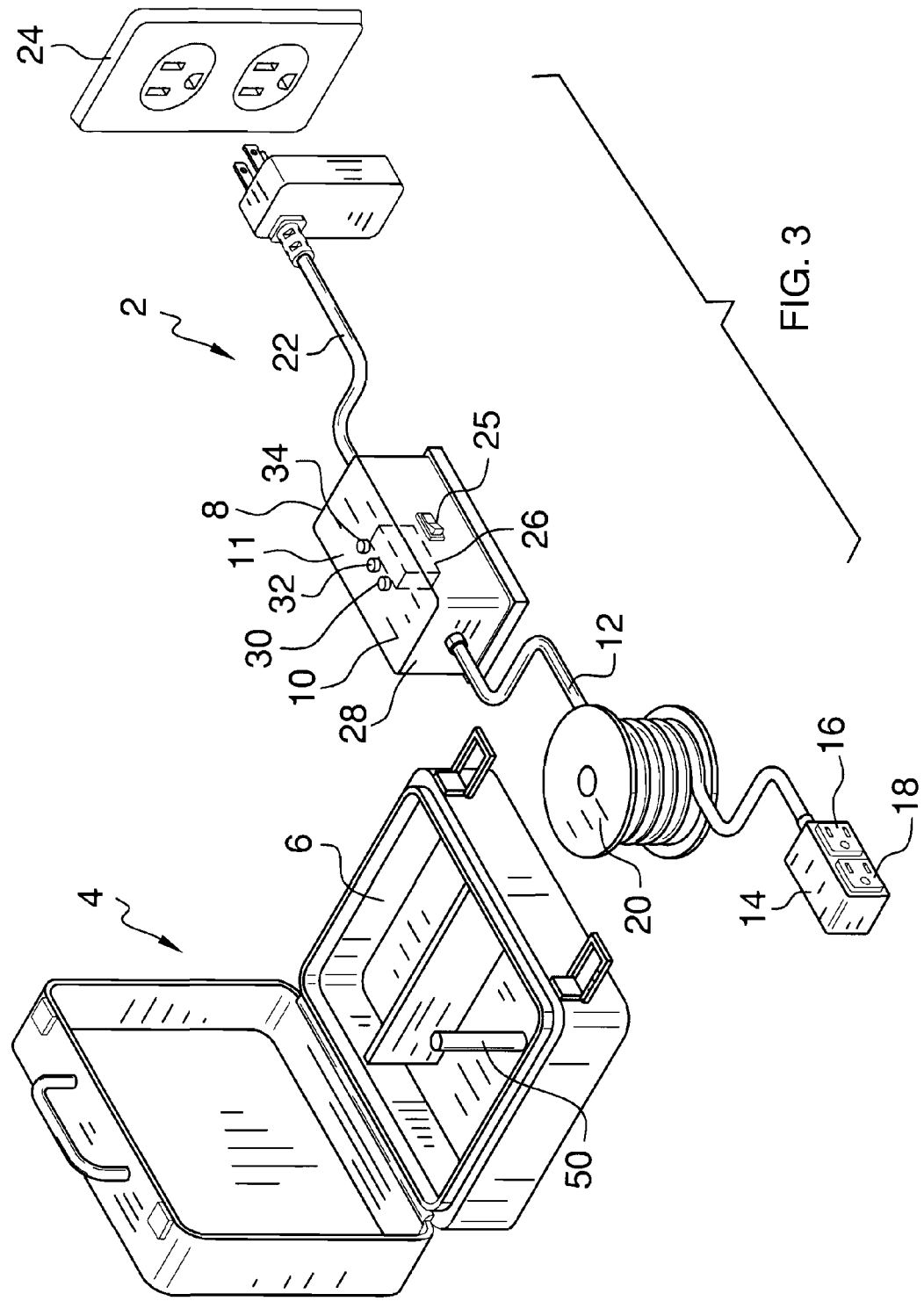
FIG. 3 shows a perspective view of the battery operated electrical cord as it would appear, ready for use.
Figure 4:
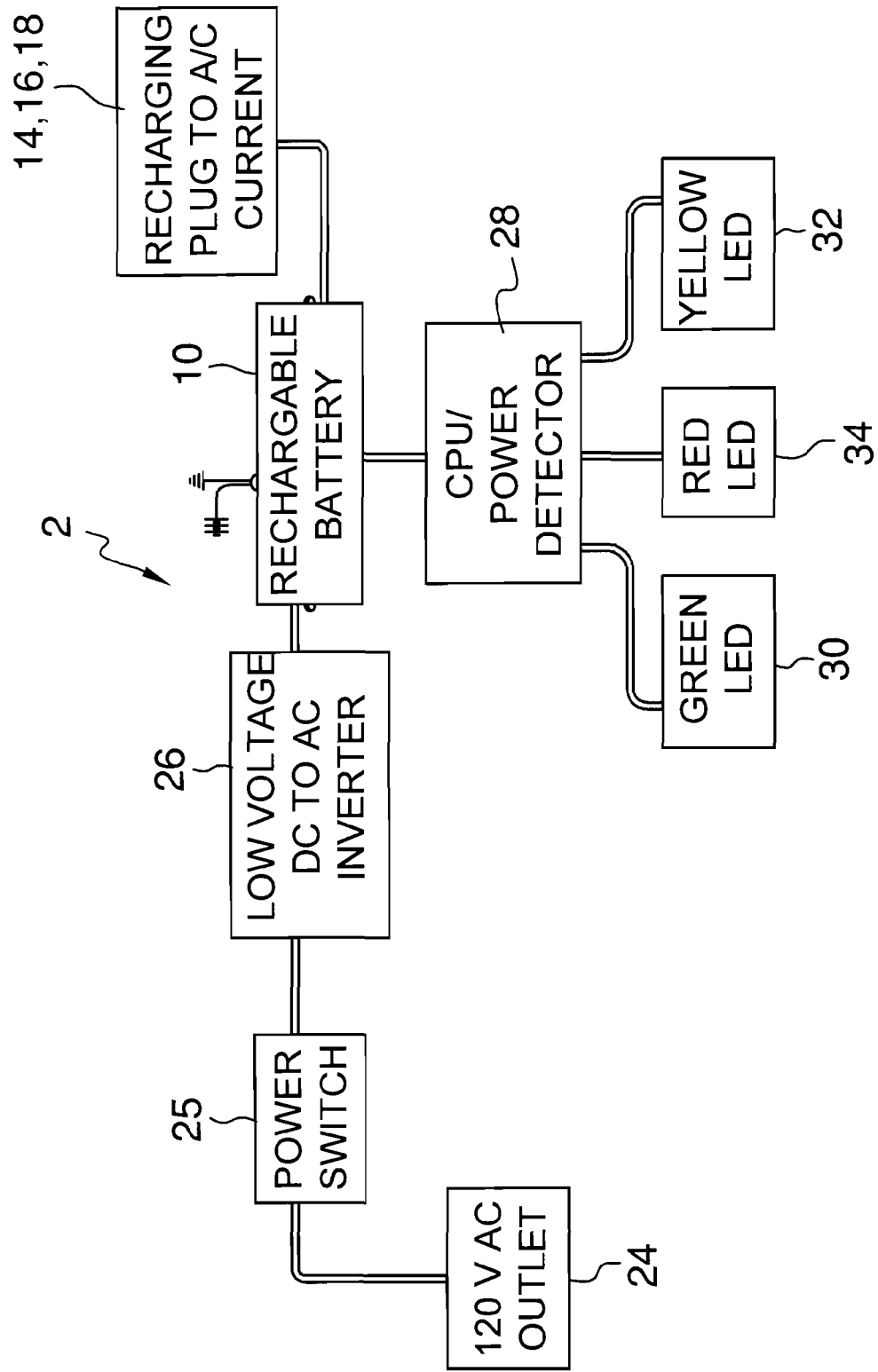
FIG. 4 shows a schematic diagram of the battery operated electrical cord and its associated components.

With reference now to the drawings, and in particular to FIGS. 1 through 4 thereof, a new battery operated electrical cord embodying the principles and concepts of the present invention and generally designated by the reference numeral 2 will be described.

As best illustrated in FIGS. 1 through 4, the battery operated extension cord 2 comprises a housing 4 that encapsulates the present invention. The housing 4 can have a wide variety of dimensions, but preferably has dimensions of eight inches by eight inches by four inches. Within the housing 4 is located a pocket 6 that occupies a portion of the space within the housing 4. The pocket 6 is designed to store a battery unit 8.

The battery unit 8 itself holds at least one rechargeable battery 10 within it and is designed to provide power to the present invention. In addition, the battery unit 8 contains a separate charger 11 within it that allows a rechargeable battery 10 within it to be effectively recharged on an ongoing basis.

A cord 12 having two ends, a first end and a second end, is connected to the charger 8. The first end of the cord 12 is connected to the charger 11 within the battery unit 8, while the second end of the cord 12 is connected to a paired unit 14 of 125-volt AC receptacles 16 and 18. A vast majority of the length of the cord 12 is wound around a spool 20, which normally fits within the housing 4 and is mounted on a spire 50 when the present invention is being stored.

The present invention also includes an additional cord 22 that connects the battery unit 8 to standard electrical current. This cord 22 has two ends comprising a first end and a second end, with the first end of the cord 22 being connected to the battery unit 8 and the second end of this cord 22 being connected to a standard electrical outlet 24, where it can receive standard electrical power.

The battery unit 8 further includes an external power switch 25 that regulates the flow of power from the cord 22 to an inverter 26, which is not in plain sight and is located within the battery unit 8. The inverter 26 actually changes the alternating current from the standard household current and converts it to direct current, where it is then used to charge each battery 10 located within the battery unit 8.

The battery unit 8 further includes a central processing unit (CPU) 28 which measures the amount of charge located within all of the batteries 10 present in the battery unit 8. The CPU 28 is connected to a series of lights that are externally located on the battery unit 8, with these lights being a green light 30, a yellow light 32, and a red light 34. If the green light 30 is displayed, then this would indicate to a person that the batteries within the battery unit 8 are fully charged. If the yellow light 32 is displayed, then this would indicate to a person that the batteries within the battery unit 8 are not yet fully charged. If the red light 34 is displayed, then this would indicate to a person that the batteries within the battery unit 8 have little to no charge.

If the present invention is not in use, an individual could hook up the second end of the cord 22 to an electrical outlet 24 and charge up the batteries 10 located within the battery unit 8. Once this is accomplished, then the present invention could be stored away in the housing 4 for later use. When needed, the components of the present invention could be taken out, with an individual plugging an electrical plug 40 into one of the receptacles 16 or 18 that are located on the paired unit 14. For a limited time, at least until the batteries 10 within the battery unit 8 run out, the individual would enjoy a use of standard electrical power derived directly from the batteries 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A battery operated electrical cord comprising
a battery unit, the battery unit including at least one battery,
a first cord having two ends comprising a first end and a second end, the first end of the cord being connected to the battery unit,
at least one electrical receptacle attached to the second end of the first cord,
means for storing the battery-operated electrical cord,
means for storing the first cord,
means for charging the each battery within the battery unit,
wherein each of the batteries within the battery unit is a rechargeable battery,
wherein the means for charging each battery within the battery unit further comprises
a second cord having two ends comprising a first end and a second end,
an electrical inverter located within the battery unit, wherein the first end of the second cord is attached to the electrical inverter,
a charger located within the battery unit, the charger being connected to the electrical inverter,
an electrical outlet, the electrical outlet being connected to standard household current,
wherein the second end of the second cord is connected to the electrical outlet,
wherein the means for storing the first cord further comprises a spool, wherein a majority of the length of the first cord is wrapped around the spool.

2. A battery operated electrical cord according to claim 1 wherein the means for storing the battery-operated electrical cord further comprises
(a) a housing,
(b) a pocket located within the housing,
(c) a spire located within the housing,
(d) wherein the battery unit of the battery-operated electrical cord is placed within the pocket, and
(e) further wherein the spool is mounted on the spire.

3. A battery operated electrical cord according to claim 2 wherein the electrical cord further comprises means for regulating the flow of power from the cord to an inverter.

4. A battery operated electrical cord according to claim 3 wherein the means for regulating the flow of power from the cord to an inverter further comprises a power switch, the power switch being attached to the battery unit, further wherein the power switch is connected to the first cord, and further wherein the power switch is connected to the inverter.

5. A battery operated electrical cord according to claim 4 wherein the battery operated electrical cord further comprises
(a) means for measuring the amount of charge within the batteries located within the battery unit, and
(b) means for visually displaying the amount of charge within the batteries located within the battery unit.

6. A battery operated electrical cord according to claim 5 wherein the means for measuring the amount of charge within the batteries located within the battery unit further comprises
(a) a central processing unit located within the battery unit,
(b) wherein the central processing unit is attached to each of the batteries located within the battery unit.

7. A battery operated electrical cord according to claim 6 wherein the means for visually displaying the amount of charge within the batteries located within the battery unit further comprises
(a) a plurality of lights externally attached to the battery unit, the plurality of lights including a green light, a yellow light, and a red light,
(b) wherein each of the lights are connected to the central processing unit,
(c) further wherein the central processing unit will light up the green light when the batteries located within the battery unit are fully charged,
(d) further wherein the central processing unit will light up the yellow light when the batteries located within the battery unit are not yet fully charged,
(e) further wherein the central processing unit will light up the red light when the batteries located within the battery unit have little to no charge.

* * * * *